United States Patent [19]

Kurihara et al.

[11] 4,214,301

[45] Jul. 22, 1980

[54] DIAGNOSTIC DEVICE FOR USE WITH AUTOMATIC CONTROL SYSTEMS

[75] Inventors: Nobuo Kurihara, Hitachiota; Yoshio Sato, Hitachi; Shigeyoshi Kawano, Hitachiota; Michihiro Iioka, Katsuta; Daizo Iba; Tadashi Kurihara, both of Hitachi, all of Japan

[73] Assignee: Hitachi, Ltd., Tokyo, Japan

[21] Appl. No.: 884,235

[22] Filed: Mar. 7, 1978

[30] Foreign Application Priority Data

Mar. 8, 1977 [JP] Japan .................................. 52-24383

[51] Int. Cl.² .................... G05B 17/00; G05B 13/02; G06F 15/46

[52] U.S. Cl. .................................. 364/119; 318/561; 364/106

[58] Field of Search .............. 364/105, 106, 118, 119, 364/116; 318/561, 563

[56] References Cited

U.S. PATENT DOCUMENTS

| | | | |
|---|---|---|---|
| 3,221,230 | 11/1965 | Osburn | 364/106 X |
| 3,601,588 | 8/1971 | Bristol | 364/106 |
| 3,767,900 | 10/1973 | Chao et al. | 364/106 |
| 3,795,799 | 3/1974 | Courtiol | 364/106 |
| 4,054,780 | 10/1977 | Bartley et al. | 364/106 |

*Primary Examiner*—Joseph F. Ruggiero
*Attorney, Agent, or Firm*—Craig & Antonelli

[57] ABSTRACT

In an automatic control system, controls receive an input indicative of a deviation between feedback and demand signals and produce an output which in turn is applied to a plant to control it. A diagnostic device includes a model having an equivalent characteristic to the controls and receives the deviation signal. When a noise coming into the automatic control system is detected or when a deviation between the outputs of the model and controls is sufficiently small, no model operation is performed, and the output of the controls is determined as that of the model. However, when the deviation between the outputs of the model and the controls is large, the model is supplied with an input thereby performing a model operation. A resultant output of the model is then compared with the output of the controls to produce an alarm indicative of an abnormal state of the controls in accordance with a deviation between these outputs.

3 Claims, 12 Drawing Figures

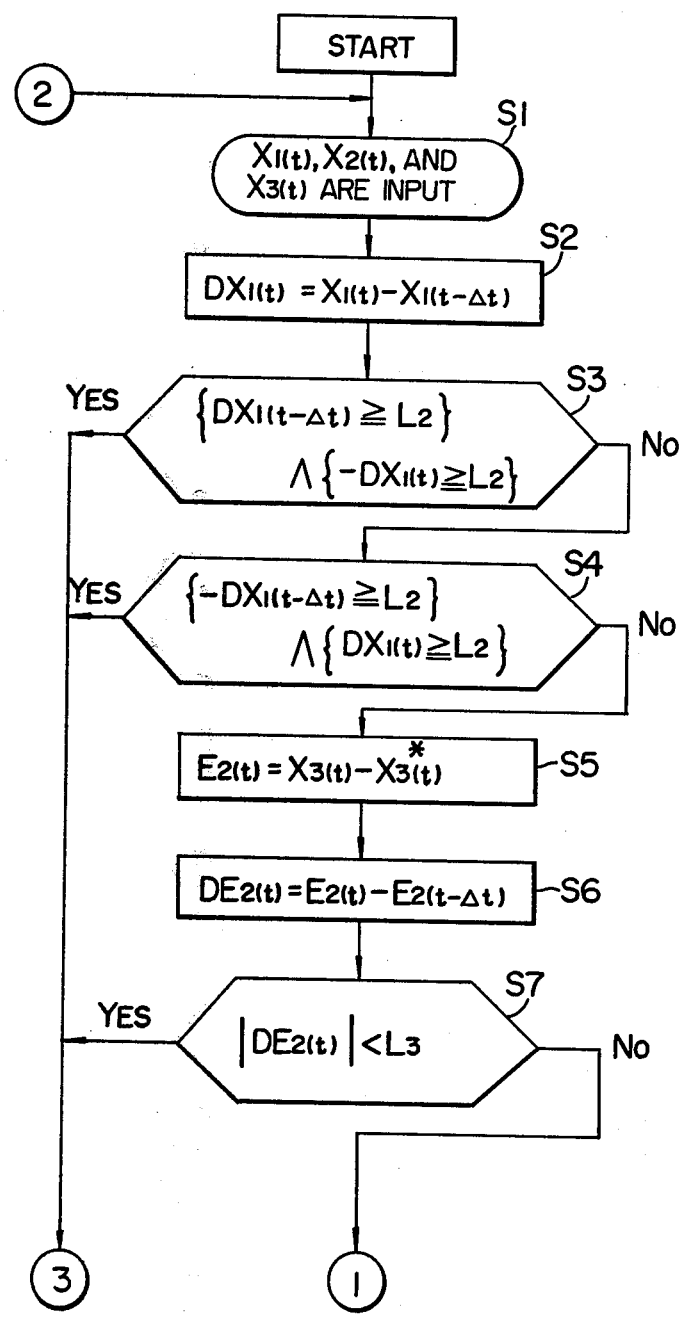

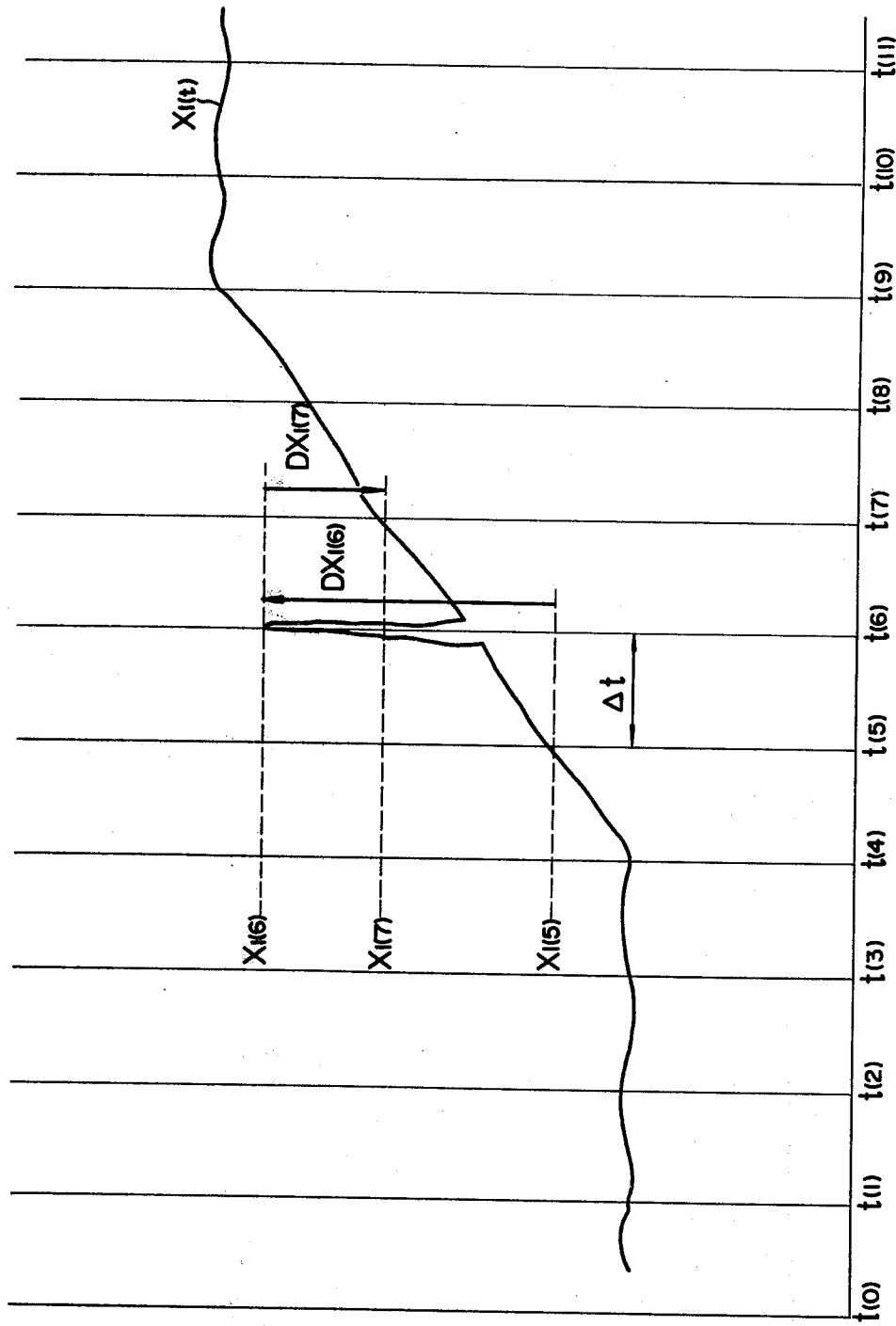

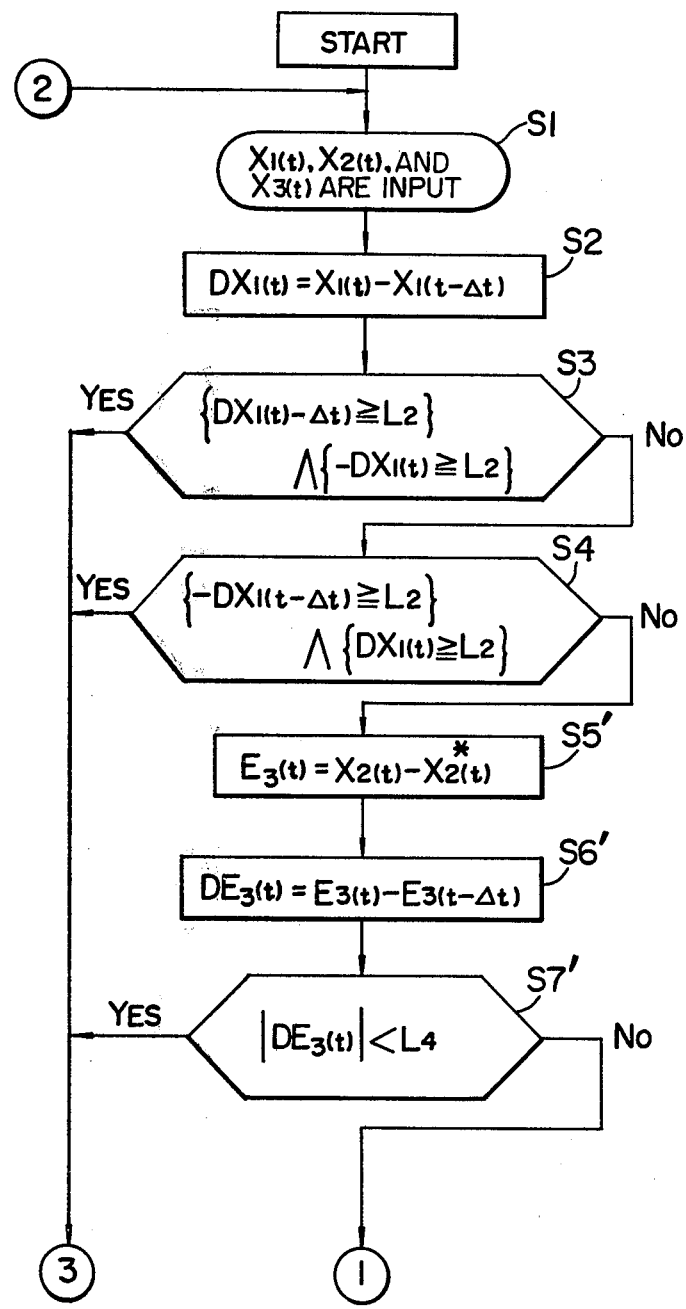

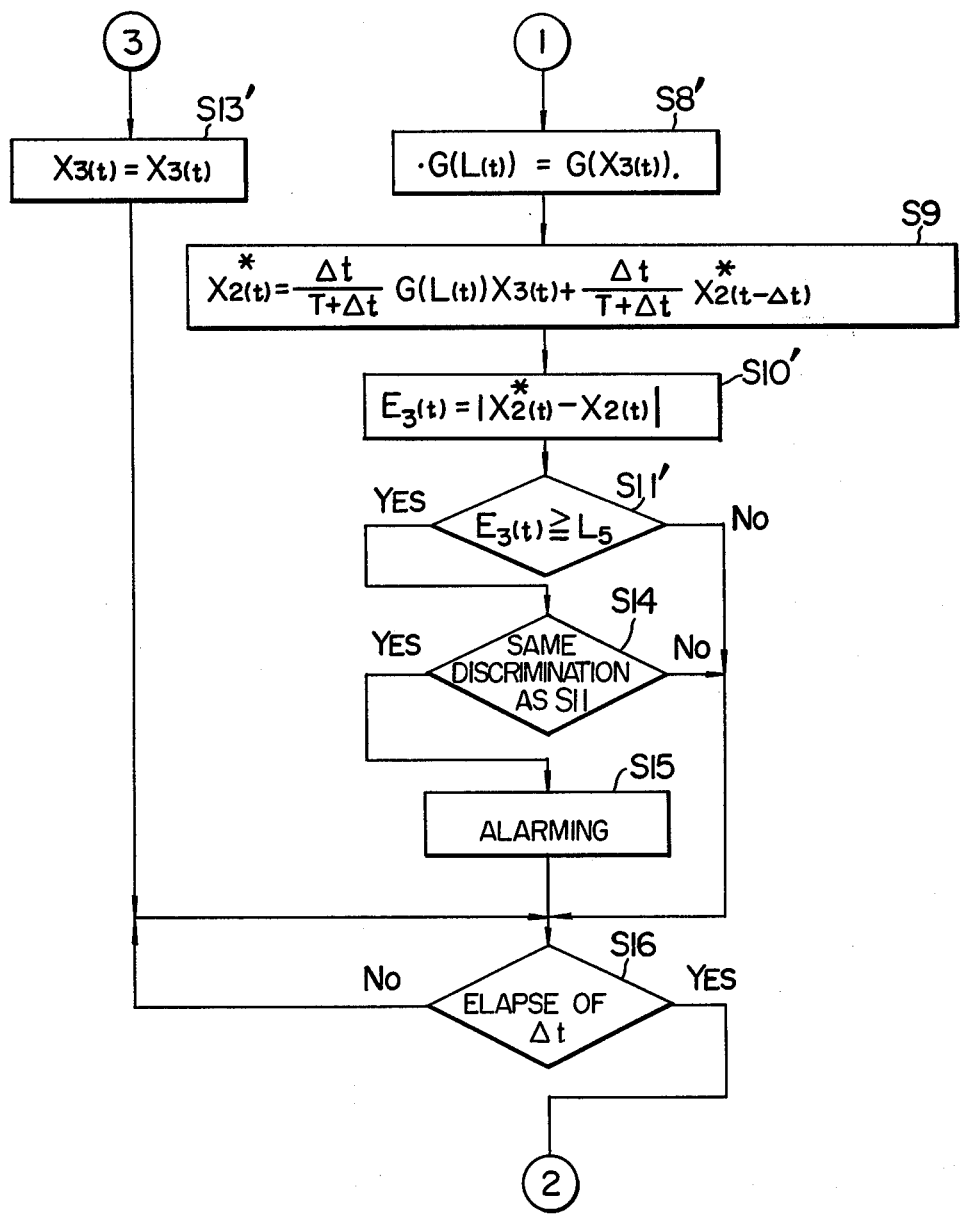

DIAGNOSTIC DEVICE FOR USE WITH AUTOMATIC CONTROL SYSTEMS

BACKGROUND OF THE INVENTION

This invention relates to a device for detecting an abnormal state of controls or of a plant, which is an object to be controlled by the former, in an automatic control system. More particularly, the invention relates to a diagnostic device for use with automatic control systems which is based on a model reference method wherein there is provided a model having a characteristic simulated to that of the controls or plant, and outputs of the model and plant are compared for detecting an abnormal state of the plant or the like.

A widespread use has been made of automatic control systems in industrial fields, and many of them are of a so-called closed loop type utilizing a feedback signal. More particularly, a plant, which is an object to be controlled, is operated by the output signal from controls while the controls are operated depending on the deviation between the plant output and the demand signal corresponding thereto. The output of plant is generally termed the feedback signal. In such automatic control systems, in the event of failure of the control system, there occurs a controlling out of the command of the demand signal originally intended and a consequent overrunning or running-down of the plant. In view of trouble shooting, the running-down of the plant has a tendency toward overall safety in general, and usually invites no serious problems. However, it can be disagreeable in a case where the plant controllable by the control system in question is connected with additional plants because the additional systems of plant may be adversely affected. The larger and more sophisticated the systems are, the more seriously they tend to be effected. Conversely, overrunning is often fatal, since it results in the possibility of serious damage of the component apparatus.

For the above reasons, in the past, it was the practice to quickly detect failures of the control system through various methods and take care of the plant suitably. One of the conventional methods for detection of the abnormal state of a control system is to monitor the deviation signal between the demand and feedback signals, as disclosed, for example, in Japanese Patent Publication No. 6815/72. This method is based on the fact that "the demand signal substantially coincides with the feedback signal under the stationary condition." Although having the capability of detecting the failure with high accuracy under the stationary condition, this method has many difficulties with the detection under the transient condition. For example, when the demand value is changed, the absolute value of the deviation signal increases. But this fact alone makes no distinction between a change of demand value (normal) and a failure of the system (abnormal). Additionally, with a retard response of the plant, the state remaining in increased deviation continues for a long time. Therefore, an increase in detection sensitivity of the diagnostic device is prone to an erroneous discrimination; conversely, for elimination of the erroneous discrimination, the detection sensitivity must be decreased. In any event, the deviation monitor method fails to detect the abnormal state under the transient condition.

Recently, in place of the aforementioned method, a method called the model reference method has been highlighted, as exemplified in a Japanese patent application laid open to the public as No. 58279/73, wherein there is provided a model having an input-output characteristic $$W(S) \text{ of } \frac{G_1(S) \cdot G_2(S)}{1 + G_1(S) \cdot G_2(S)},$$

for example, where $G_1(S)$ represents an input-output characteristic of the controls and $G_2(S)$ represents an input-output characteristic of the plant. The model is supplied with a deviation signal between the demand and feedback signals so that the output of the model is compared with the feedback signal representative of the output from the plant. The above $W(S)$ is generally termed the total transfer function. In the model reference method, the model $W(S)$ may be formulated in an analog or digital expression, and, especially, it is desirable to digitally formulate a sophisticated $W(S)$ by means of a microcomputer or similar device. If there occurs no failure in the feedback control system whose abnormal state is to be detected, the signal passed through the model $W(S)$ coincides with the feedback signal irrespective of any change in the demand signal, and the deviation signal between these two signals is always zero. Thus, in contrast to the aforementioned deviation monitor method in which the deviation signal varies under the transient condition even when the system is in a normal state, this model reference method is freed from variations in the deviation signal when the system is in the normal state so that detection sensitivity can be increased. At the same time, the erroneous discrimination is suppressed from occurring. Actually, however, this method, when reduced to practice, suffers from variations in the deviation signal for various causes even when no failure of an object to be diagnosed occurs, thereby giving rise to erroneous discrimination. Typical causes of this are:

I. Interference by noise

An object to be diagnosed standing for a plant or an analog automatic control system generally has a sophisticated characteristic expression. Consequently, the model is usually programmed for a digital operation device such as a computer instead of being constituted by an analog operation circuit. Thus, in order for an operation by the model programmed in a computer to be executed, it is necessary to convert analog outputs at component apparatus in the automatic control system into digital quantities. In other words, the analog output is sampled at a predetermined period $\Delta t$ for its conversion into a digital signal of n bits. Digital signals, however, are sensitive to noises and the noises interfere with any bits of the digital signal at the same probability. No serious problems are raised if the noise interferes with bits of a lower digit, but the noise interfering with bits of an upper digit affects the model operation to a great extent, resulting in erroneous discrimination. Further, the actuation of various switches in the automatic control system causes direct spike noises to come into the analog signal, and it happens that the sampling is carried out in synchronism with the spike noise.

II. Accuracy of the model

Practically, it is difficult to completely simulate a model to a characteristic of an object to be diagnosed. In particular, even if the model is formulated in a mathematical expression, there still remain difficulties with letting parameters in the mathematical expression coincide with an actually existing object to be diagnosed.

Adjustment of such parameters will require characteristic tests on the object in many cases. However, complete characteristic tests are theoretically impossible, and therefore these tests should be terminated with a reasonable degree of incompletion. Since errors due to the parameters of the model are accumulated when the model has integrating terms, the deviation between outputs of the object and the model is increased with a lapse of time and erroneous detections of abnormal states result.

SUMMARY OF THE INVENTION

An object of this invention is to provide a diagnostic device based on a model reference method in which even with a model whose parameters will not completely coincide with those of an object to be detected, detection errors due to errors in a model operation can be eliminated.

Another object of this invention is to provide a diagnostic device based on the model reference method capable of preventing erroneous alarms even when interferences by spike noises occur.

According to the invention, a diagnostic device comprises a model having an equivalent input-output characteristic to that of an object to be diagnosed, which model receives a model input which is an input to the object. By comparing a model output with an output from the object, the model output is determined as the object output when a resultant deviation is small. On the other hand, the model is supplied with the input signal to perform a model operation only when the deviation is large. Thereafter, a comparison is made between the model operation output and the object output to produce an alarm in accordance with a deviation resulting from this comparison.

BRIEF DESCRIPTION OF THE DRAWINGS

FIGS. 4a and 4b are flow chart diagrams prepared for performing the detection of abnormal states of controls by means of a digital computer in accordance with the present diagnostic device.

FIG. 5 is a graphical representation for explaining the operation of spike noise detection.

FIGS. 7a and 7b are flow chart diagrams prepared for performing the detection of abnormal states of the plant by means of the digital computer in accordance with the present diagnostic device.

DESCRIPTION OF THE PREFERRED EMBODIMENTS

Figure 1:
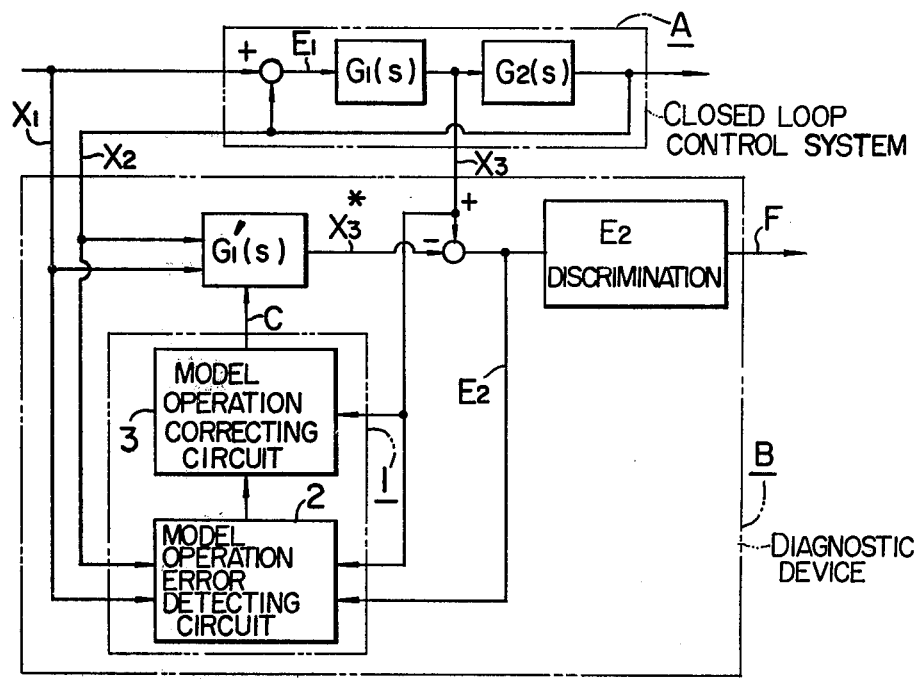
FIG. 1 is a schematic diagram of a diagnostic device embodying the invention especially designed for detecting abnormal states of controls.

Referring now to the drawing, FIG. 1 shows a basic circuit arrangement suitable for applying a diagnostic device B of the present invention to a closed loop control system A which is especially designed for monitoring abnormal states of controls alone, where $G_1(S)$ represents a transfer function of the controls. The diagnostic device B receives a control demand signal $x_1$ and calculates a deviation $E_2$ between the model output signal $x_{3^*}$ and a feedback signal $x_3$ of this closed loop system through a detecting object model $G_1'(S)$ so as to discriminate abnormal states depending on the value of the deviation $E_2$ and produce an alarm signal F when these abnormal states occur.

In addition to the construction performing the operation described above, this invention additionally comprises a model correcting unit 1. This model correcting unit 1 receives as inputs the demand signal $x_1$, deviation signal $E_2$ and feedback $x_3$, and produces a model operation result correcting signal c through a model operation error detecting circuit 2 and a model operation correcting circuit 3, thereby correcting the output signal of the controls $G_1(S)$.

Figure 2:
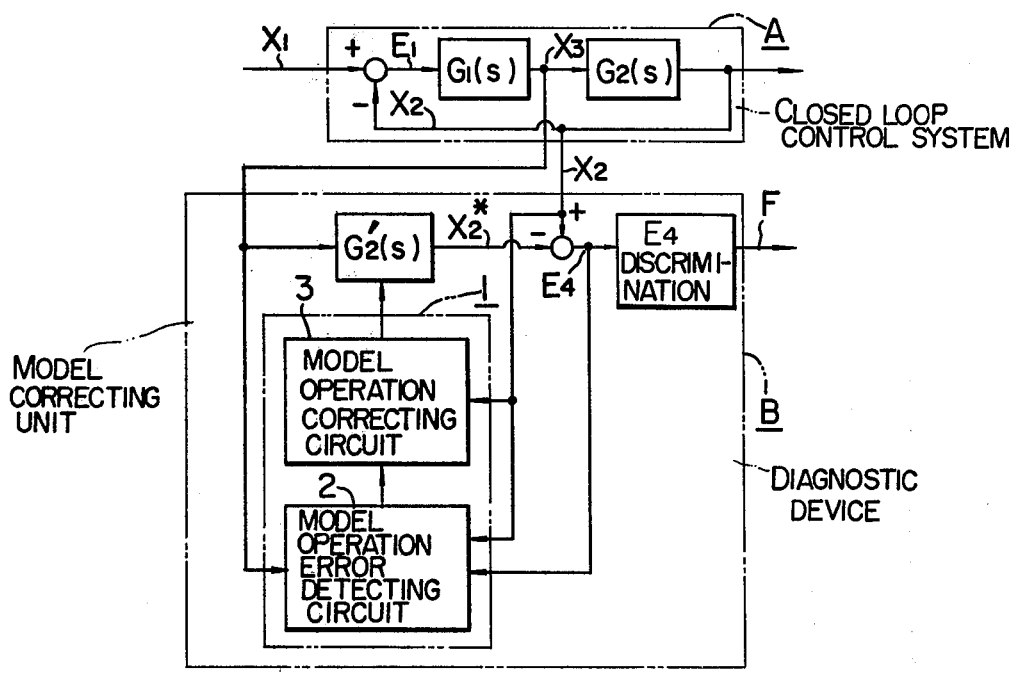
FIG. 2 is a schematic device embodying the invention especially for detecting abnormal states of a plant.

FIG. 2 shows one embodiment suitable for detecting abnormal states of a plant $G_2(S)$, and differs from FIG. 1 in that a model $G_2'(S)$ handles input and output signals, both being different from those of FIG. 1.

The function of the model correcting units in FIGS. 1 and 2 will be described later specifically by referring to flow charts.

Figure 3:
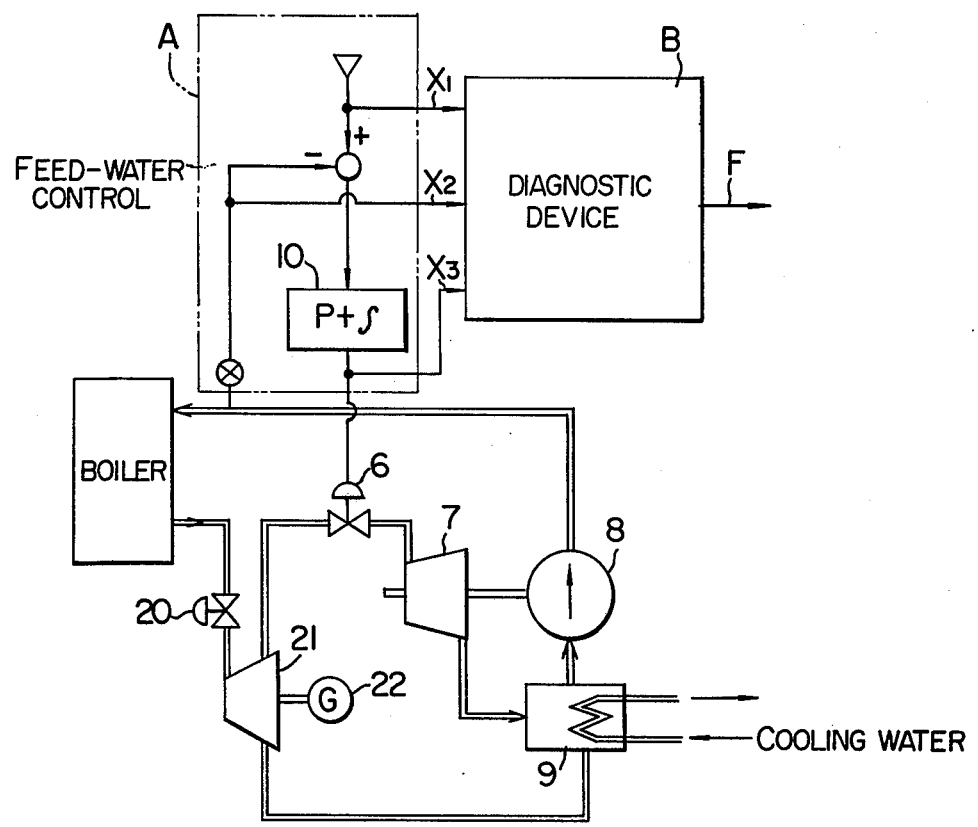
FIG. 3 is a schematic diagram of a diagnostic device embodying the invention especially designed for combination with a feed-water system in a heat power station.

FIG. 3 shows a block diagram for clarifying the input-output relation, in which a diagnostic device of the present invention is applied to a feed-water system for a boiler in a heat power plant. A general description will now be given of the heat power plant wherein a feed-water regulator valve 6 stands for an object to be controlled. Water vapor generated in a boiler is supplied through a turbine regulator valve 20 to a generator turbine 21 thereby to drive it. A generator 22 converts the mechanical power of the turbine into the electrical power. Water vapor sent from the turbine 21 is fed to a condenser 9 and cooled therein by cooling water to turn into water. Water from the condenser is again supplied to the boiler through a feed-water pump 8. In such a feed-water system that, the water sent from the condenser 9 is so pressurized in the feed-water pump 8 as to be fed to the boiler, and the feed-water pump 8 is driven by a feed-water pump drive turbine 7 which is operated, for example, with bleeding vapor from the generator turbine 21. Feed-water controls A effects a proportional-integrating control of the regulator valve 6 provided for the generator turbine so as to let a feed-water quantity $x_2$ from the feed-water pump 8 coincide with a demand signal $x_1$. A diagnostic device B is adapted to provide an early detection of failures of the feed-water controls A and may be realized as shown in FIG. 2 by receiving as inputs feed-water command signal $x_1$, feed-water quantity signal $x_2$ and feed-water control signal $x_3$, and delivering as an output the alarm signal F. In comparing of FIG. 2 with FIG. 3, it will be seen that $G_1(S)$ corresponds to a characteristic of the proportional-integrating controls 10 and that $G_2(S)$ corresponds to a characteristic of a component involving valve 6, turbine 7 and pump 8.

Figure 4B:
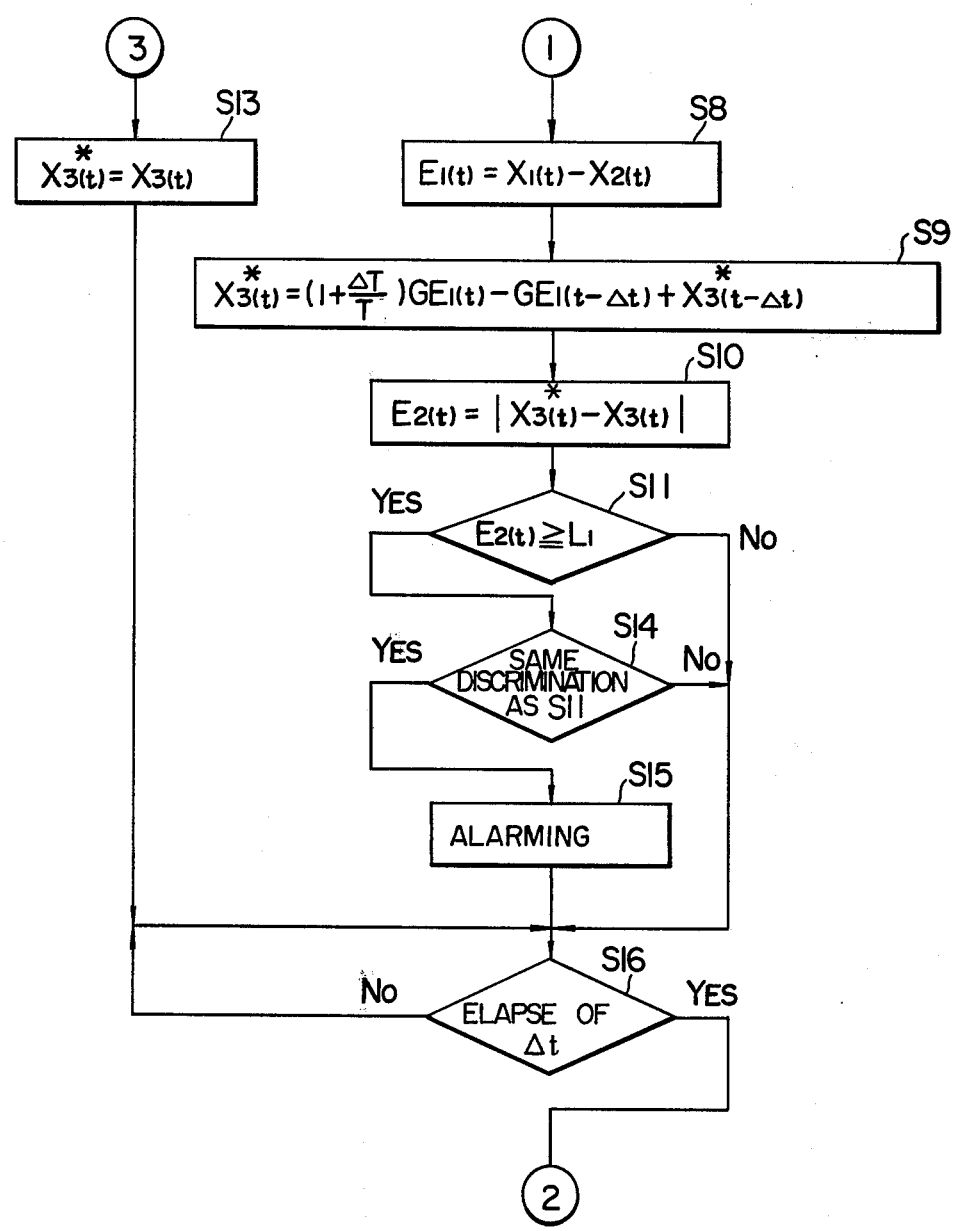

FIGS. 4a and 4b show an operation flow when the diagnostic device B of FIG. 3 is simulated by a digital computer. Step S1, an input section, receives the feed-water command signal, feed-water quantity signal, and feed-water control signal and formulates them as $X_1(t)$, $X_2(t)$ and $X_3(t)$, respectively.

Hereinafter, a description will be given of a diagnosis of the controls, followed by a description of a diagnosis of the plant.

The operation flow will be described in the order of operation steps by referring to functions of blocks shown in FIG. 1 for better understanding of the invention.

The model $G_1'(S)$ of FIG. 1 will first be discussed which performs operations as shown in steps S8 and S9 in FIG. 4b.

From equation (1), a deviation $E_1(t)$ between a demand signal $X_1(t)$ and a feedback signal $X_2(t)$ is obtained:

$$E_1(t) = X_1(t) - X_2(t) \tag{1}$$

A model output $X_3*(t)$ is then obtained from equation (2):

$$X_3*(t) = (1 + \frac{\Delta t}{T})GE_1(t) - GE_1(t - \Delta t) + X_3*(t - \Delta t) \tag{2}$$

where $X_3*$ and $E_1$ suffixed with (t) represent values of $X_3*$ and $E_1$ which are sampled and fetched at time t. Similarly, $X_3*$ and $E_1$ suffixed with $(t-\Delta t)$ represent values of $X_3*$ and $E_1$ sampled and fetched at a time in advance of t by $\Delta t$. This meaning of the suffix is also valid for explaining the time relationship between digital signals.

The above equation (2) digitally expresses a model derived from transfer function $G_1(S)$ of the analog controls shown in FIG. 1. That is to say, $G_1'(S)$ can be expressed by the following equation (4) in terms of a Laplace operator S which, in turn, may be replaced by equation (5) in terms of time-domain, bearing in mind the fact that 1/S means the integration in time-domain:

$$G_1'(S) = \frac{X_3}{E_1} = (1 + \frac{1}{TS})G \tag{4}$$

$$X_3(t) = GE_1(t) + \frac{G}{T} \int E_1(t)dt \tag{5}$$

where G in equation (4) represents a gain and T represents an integral time constant. By differentiating righthand and lefthand terms is equation (5), equation (6) is obtained which in turn may be replaced by equation (7) in the form of a finite difference formula, bearing in mind the fact that differential term $dX_3/dt$, for example, is a calculation to obtain a rate of change of $X_3$ within $\Delta t$:

$$\frac{dX_3(t)}{dt} = G\frac{dE_1(t)}{dt} + \frac{G}{T}E_1(t) \tag{6}$$

$$\frac{X_3(t) - X_3(t - \Delta t)}{\Delta t} \tag{7}$$

$$= G\frac{E_1(t) - E_1(t - \Delta t)}{\Delta t} + \frac{G}{T}E_1(t)$$

where $\Delta t$ in equation (7) has the meaning of a sampling period in the case of an input of digital signals, and $(t-\Delta t)$ corresponds to a time in advance of t by one sampling period.

From equation (7), $X_3(t)$ may be expressed by equation (8) which is a characteristic equation of the digital model:

$$X_3(t) = G(1 + \frac{\Delta t}{T})E_1(t) - GE_1(t - \Delta t) + X_3(t - \Delta t) \tag{8}$$

As the model output, $X_3(t)$ may be expressed by using $X_3*(t)$ as shown in FIG. 2 so that equation (8) may be replaced by equation (9):

$$X_3*(t) = G(1 + \frac{\Delta t}{T})E_1(t) - GE_1(t - \Delta t) + X_3*(t - \Delta t) \tag{9}$$

This model equation (9) is valid for the proportional-integrating operation. If the controls effect a proportional-integrating-differentiating control, a model equation such as expressed by equation (10) may be obtained through a similar analysis:

$$X_3*(t) = (1 + \frac{\Delta t}{T} + \frac{Kp}{\Delta t})GE_1(t) - \tag{10}$$
$$(1 + 2\frac{Kp}{\Delta t})GE_1(t - \Delta t) + \frac{Kp}{\Delta t}GE_1(t - 2\Delta t)$$

where Kp represents a differential coefficient.

Thus, the model is formulated by the above equations and operated through steps S8 and S9 in FIG. 4b.

Next, the function of the model operation error detecting circuit 2 will be explained. This function includes two partial functions, i.e., a spike detecting function and a discrimination function which determines the necessity of the model operation by monitoring the deviation $E_2$ between controls output $X_3$ and model output $X_3*$.

I. Spike detecting function

This function is carried out through steps S2, S3 and S4 in FIG. 4a. In step S2, a rate of change $DX_1(t)$ of a command signal $X_1$ is calculated in accordance with equation (11):

$$DX_1(t) = X_1(t) - X_1(t - \Delta t) \tag{11}$$

where, as mentioned in the foregoing description, $X_1(t)$ represents a value of $X_1$ which is sampled and fetched at time t and $X_1(t-\Delta t)$ represents a value of $X_1$ sampled and fetched at a time in advance of t by one sampling period $\Delta t$. This rule is also applicable to $X_2$ and $X_3$.

In steps S3 and S4, the presence or absence of spike noise contained in the command signal $X_1(t)$ will be determined in accordance with the following equations (12) and (13) by using $DX_1$ obtainable from equation (11):

$$\{DX_1(t - \Delta t) \geq L_2\} \wedge \{-DX_1(t) \geq L_2\} \tag{12}$$

$$\{-DX_1(t - \Delta t) \geq L_2\} \wedge \{DX_1(t) \geq L_2\} \tag{13}$$

where the symbol " $\wedge$ " represents the logic "AND."

The spike noise can be detected in accordance with equations (12) and (13), as will be detailed by referring to FIG. 5. In equation (12), it is meant by the fact that righthand and lefthand terms are satisfied simultaneously that a sharp spike noise occurs in the positive-going direction. In equation (13), it is meant by the same fact as in equation (12) that a sharp spike noise occurs in the negative-going direction. As shown in FIG. 5, the feed-water command signal $X_1$ remains substantially unchanged until time t(4), from which it increases gradually until time t(9). If a spike noise interferes with the command signal at time t(6), $X_1(6) > X_1(7) > X_1(5)$ stands, where $X_1(5)$, $X_1(6)$ and $X_1(7)$ are values of $X_1$ at times t(5), t(6) and t(7), respectively. Between times t(6)

and t(5), the difference $DX_1(6)$ occurs as expressed in equation (12)':

$$DX_1(6)=X_1(6)-X_1(5)>0 \quad (12)',$$

and the difference $DX_1(7)$ occurs between times t(7) and t(6) as expressed in equation (12)":

$$DX_1(7)=X_1(7)-X_1(6)<0 \quad (12)''.$$

Equations (12)' and (12)" correspond to the lefthand and righthand terms of equation (12), respectively, so that if $DX_1(6)$ and $-DX_1(7)$ are respectively larger than $L_2$, the positive spike noise can be detected. For convenience of explanation, $X_1(t)$ is illustrated in FIG. 5 as having a sufficiently large gradient. Actually, however, a change of $X_1(t)$ within $\Delta t$ is sufficiently small as compared with the noise. This ensures that the noise can be detected at high sensitivity. Obviously, $L_2$ is made larger than a normal change of $X_1(t)$, i.e., $\Delta X_1(t)$ within $\Delta t$. As gathered from equation (12), the detection of the positive spike noise is effected by catching such a change of $DX_1$ as sharply increasing at one instant and sharply decreasing at a subsequent instant. Similarly, in accordance with equation (13), the negative spike noise can be detected by catching such a change of $DX_1$ as sharply decreasing at one instant and sharply increasing at a subsequent instant.

The spike noise interfering with $X_1$ can be detected in this manner, for example. Similarly, spike noises interfering with $X_2$ and $X_3$ can be detected. In the flow chart of FIGS. 4a and 4b, only the spike noise detection for $X_1$ is formulated without referring to that for $X_2$ and $X_3$. For the spike noise detection for $X_2$ and $X_3$, a similar program may be performed, provided that $X_1$ and $DX_1$ in steps S2, S3 and S4 are replaced by $X_2$ and $DX_2$, and $X_3$ and $DX_3$, respectively. It should be understood that accordance to this spike noise detecting method, the generation of a spike is detected at a sampling period which is next to a sampling period at which the spike occurs.

If no spike noise is detected in steps S3 and S4, step S5 follows, whereas with the spike noise detected, step S6 follows. In other words, when the spike noise occurs, the model operation is prevented; and only when no spike noise occurs, the model operation is permitted.

II. Discrimination function for determining necessity of the model operation

As described in the foregoing description, it is almost impossible to provide the model with parameters which completely coincide with the characteristic of controls. Accordingly, the model expression of equation (2) will inevitably contain errors. Thus, attention should be drawn to the fact that the second and third terms in equation (2) use data obtained from the preceding sampling so that executing the operation of equation (2) at every sampling time only accumulates errors. Therefore, the present invention prevents the model operation when the object assumes the normal state and permits the model operation according to equation (2) only when the object seems to assume any abnormal states. During the normal state, the model output $X_3^*(t)$ is made coincident with the output $X_3(t)$ of controls. That is to say, the initial value is set to $X_3(t)$. This ensures that errors in the model will not be accumulated, whereby the model operation and the diagnosis can be performed with high accuracy during abnormal states. Conversely, without strict adjustment of the model parameter, a highly accurate model comparison method can be ensured.

Firstly, in step S5, deviation $E_2(t)$ between $X_3(t)$ and $X_3^*(t)$ is calculated, followed by calculating the rate of change $DE_2(t)$ of the deviation $E_2(t)$:

$$E_2(t)=X_3(t)-X_3^*(t) \quad (14),$$

$$DE_2(t)=E_2(t)-E_2(t-\Delta t) \quad (15)$$

If $DE_2(t)$ is less than a threshold $L_3$ and the following equation (16) stands, the device determines that the object is normal, followed by advancing to step S13. However, if equation (16) does not stand, the device, advancing to step S8, executes the model operation so as to check whether or not the controls are abnormal:

$$\{DE_2(t)<L_3\} \quad (16)$$

In this manner, the necessity of model operation is discriminated. But various alternatives may be thought of:

(1) In the aforementioned embodiment, in order to derive the variation in deviation $E_2(t)$, the rate of change is calculated over the period between $(t-\Delta t)$ and $t$, but it is otherwise expedient to statistically deal with rates of change measured within a long time interval, whereby influence of the stationary noise is eliminated. Thus, for example, the rate of change $DE_2(t)$ may be computed in accordance with equation (17):

$$DE_2(t)=k_1 DE_2(t-\Delta t)+k_2 DE_2(t) \quad (17),$$

where $k_1$ and $k_2$ represents constants and $k_1+k_2=1$.

(2) By varying the threshold $L_3$ used in step S7 in accordance with equation (18), it is possible to prevent inactivation of the diagnostic device even when such a non-directional failure as hunting occurs:

$$L_3=k\{X_3^*(t)-X_3^*(t-\Delta t)\} \quad (18),$$

where k is constant.

Next, the alarm function will be described. The absolute value of $E_2(t)$ is first computed from equation (19) and then compared with $L_1$ to discriminate whether or not an alarm should be provided:

$$E_2(t)=\{X_3(t)-X_3(t)\} \quad (19),$$

$$E_2(t)=L_1 \quad (20).$$

Briefly, when the absolute value of the deviation between model output $X_3^*(t)$ and controls output $X_3(t)$ is larger than $L_1$, an alarm indicative of an abnormal state of the controls is provided, on condition that two or more successive abnormal states are detected. This function corresponds to steps S10, S11, S14 and S15 in FIG. 4.

In the case of steps S11 and S14 delivering "NO" or following steps S15 and S13, elapse of the sampling period $\Delta t$ is checked in step S16, and thereafter the step returns to S1 to repeat a similar program.

From the above explanation of all of the functions, it will be appreciated that the correction of model operation as described with reference to FIG. 1 corresponds to coincidence of initial values in step S13.

Under the normal operation of the controls, the aforementioned program normally proceeds in an orderly manner, tracing the following steps. In the absence of the spike noise, steps S3 and S4 determine "NO" by their discriminations so that a series of steps S1→S2→S3→S4→S5→S6 is effected. If step S7 judges that the controls are still normal, $|DE_2(t)|$ is sufficiently less than $L_3$ and, accordingly, the step S7 determines "YES," whereby one sampling period execution is completed, tracing steps S7→S13→S16. To sum this up, as far as the controls are normal and no interference of the spike noise occurs, the model performs only coincidence of the initial values (step S13). This is graphically illustrated in FIG. 6a wherein since the model output $X_3^*$, dotted lines, is nearly equal to the controls output $X_3$, solid lines, and $|DE_2(t)|$ is less than $L_3$, the model output $X_3^*$ is rendered identical with the controls output $X_3$ every sampling time. This coincidence operation for initial values is effected every sampling time under the normal operation.

Figure 6A:
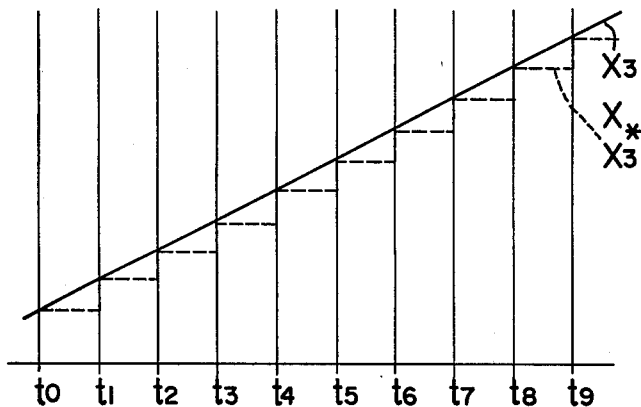
FIGS. 6a to 6c are graphical representations for explaining, with reference to FIGS. 4a and 4b, operations in a normal state, with interfering spike noise, and in an abnormal state of controls, respectively.
Figure 6B:
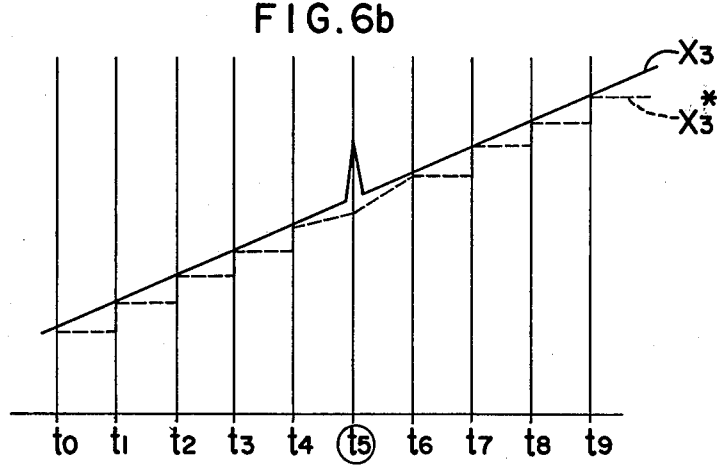

Reference is now made to FIG. 6b for discussing the presence of the spike noise. In this case, it is assumed that the spike noise interferes with the controls output at time $t_5$ and the coincidence of initial values described with reference to FIG. 6a has been completed in advance of time $t_4$. Although the noise actually occurs at $t_5$, it cannot be detected according to steps S3 and S4 because at this time only the rising or falling of the noise is observed. It is not until time $t_6$, at which subsequent falling or rising of the noise is observed, that the spike noise can be detected. Accordingly, steps S3 and S4 determine "NO," followed by step S7. In this step S7, if the spike noise having a sufficiently large magnitude is interfering with the controls output $X_3$, $|DE_2(t)|$ becomes larger than $L_3$ and step S7 determines "NO." As a result, $X_3^*(t)$ will be operated in step S9. In this case, however, the second term $GE_1(t-\Delta t)$ is zero because this term corresponds to $GE_1$ which has been observed at the preceding sampling time at which $GE_1$ has not been computed. The initial execution of the operation according to step S9 always has its second term nullified. When two or more executions are to be effected, the second term associated with the second (inclusive) or more execution can have somewhat perceptible values. This is equivalent to the fact that the initial value of integration upon execution of the proportional-integrating expression in step S9 is zero. Subsequently, in step S10, $X_3^*$ is compared with $X_3$ to produce a sufficiently large deviation since the $X_3$ contains the spike noise, so that step S11 determines "YES." Because of the first determination, however, step S15 will not provide any alarm. The operation associated with time $t_5$ has now been completed. At $t_6$, the noise contained is detected through step S3 or S4, determining "YES." Consequently, similarly to the normal operation as illustrated in FIG. 6a, the prosecution is completed following the coincidence of initial values alone. Since steps S14 and S15 are not executed, the discrimination as represented by $E_2(t) \geq L_1$ in step S14 is omitted, and no alarm being provided. If no interference of noise occurs after $t_7$, a similar operation to FIG. 6a will be performed.

Additionally, if no interference of noise with $X_3$ occurs at $t_5$ with which step S7 is now associated, step S7 determines "YES" so that no operation is performed after step S8 quite similarly to the normal state of FIG. 6a.

Figure 6C:
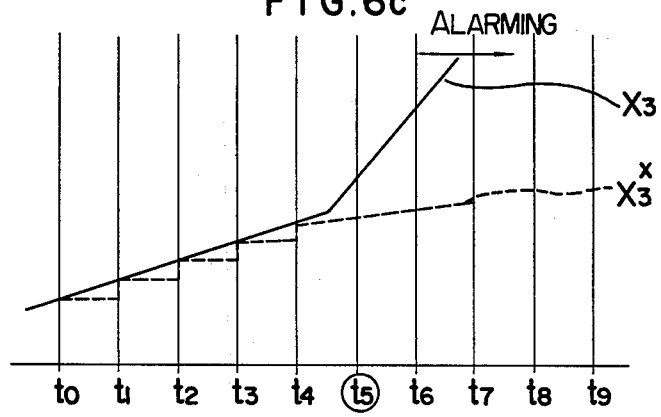

Finally, reference is made to FIG. 6c for discussing the abnormal state of the controls. It is assumed that the abnormal state occurs at time $t_5$, and, accordingly, the controls output $X_3$ begins to increase steeply. As already described with reference to FIG. 6a, only the coincidence of initial values was completed before time $t_4$. Since $X_3$ increases rapidly at $t_5$, $|DE_2(t)|$ becomes larger than $L_3$ in step S7, thereby determining "NO." The model output $X_3^*$ is operated in step S9 and compared with $X_3$ in step S10. Because of the rapid increase in $X_3$ and consequent $E_2(t)$ being larger than $L_1$, step S10 determines "YES." For the prosecution at $t_5$, the "YES" determination in step S11 is the first or initial one, and, is therefore followed by steps through steps S14 and S16 to terminate the prosecution. At time $t_6$, the prosecution is effected through steps S1→S2→S3→S4→S5→S6→S7→S8→S9→S10→S11, wherein $E_2(t)$ also becomes larger than $L_1$ and step S11 determines "YES." As a result, two successive determinations of "YES" by step S11 take place, so that an alarm for the abnormal state of controls being provided.

As will be understood from the above description, according to the invention, two or more determinations of "YES" by step S11 lead to the provision of the alarm. Further, since only the coincidence of initial values is normally executed, errors in the model cannot be accumulated. The model operation is effected only when the deviation between $X_3^*$ and $X_3$ is large ensure a highly accurate model for the diagnosis.

Now, apart from the controls, a further embodiment will be described wherein diagnosis based on the model comparison method is applied to a plant. This diagnosis, as shown in FIG. 2, differs from FIG. 1 in that a model $G_2'(S)$ receives a feedback signal $X_2$ alone. FIGS. 7a and 7b show a flow chart for explaining the diagnosis for a plant, which flow chart is almost similar to that of FIGS. 4a and 4b. The model of FIG. 2 is different from that of FIG. 1 in its model characteristic in the first place.

Actually, the model of the plant is much more sophisticated than that of the controls but it is not always necessary for the intended diagnosis to accurately express the former model. Therefore, according to the invention, the plant model is expressed in terms of the linear delay in which gain G is a function of load L:

$$G_2'(S) = \frac{X_2}{X_3} = \frac{G(L)}{1 + TS} \quad (21).$$

Bearing in mind the fact that a Laplace operator S means the differential, equation (21) may be expressed in the time-domain by equation (22):

$$X_2(t) + T\frac{dX_2(t)}{dt} = G(L(t)) \cdot X_3(t) \quad (22).$$

Equation (22) may be replaced by equation (23) by converting $dX_2(t)/dt$ into a finite difference expression:

$$X_2^*(t) + T\frac{X_2^*(t) - X_2^*(t - \Delta t)}{\Delta t} = G(L(t)) \cdot X_3(t) \quad (23),$$

where $X_2^*(t)$ represents the model output.

Thus, $X_2^*(t)$ is expressed by equation (25), through $$X_2^*(t)(1 + \frac{T}{\Delta t}) = G(L(t)) \cdot X_3(t) + \frac{T}{\Delta t} X_2^*(t - \Delta t) \quad (24),$$

$$X_2^*(t) = \frac{\Delta t}{T + \Delta t} G(L(t)) \cdot X_3(t) + \frac{T}{T + \Delta t} X_2^*(t - \Delta t) \quad (25).$$

Equation (25) indicates the model, where although being variable with the magnitude of load L(t), the G(L(t)) may be calculated by making it variable with the output $X_3(t)$ of the controls since the load L(t) corresponds to the controls output $X_3(t)$, for example.

Figure 8:
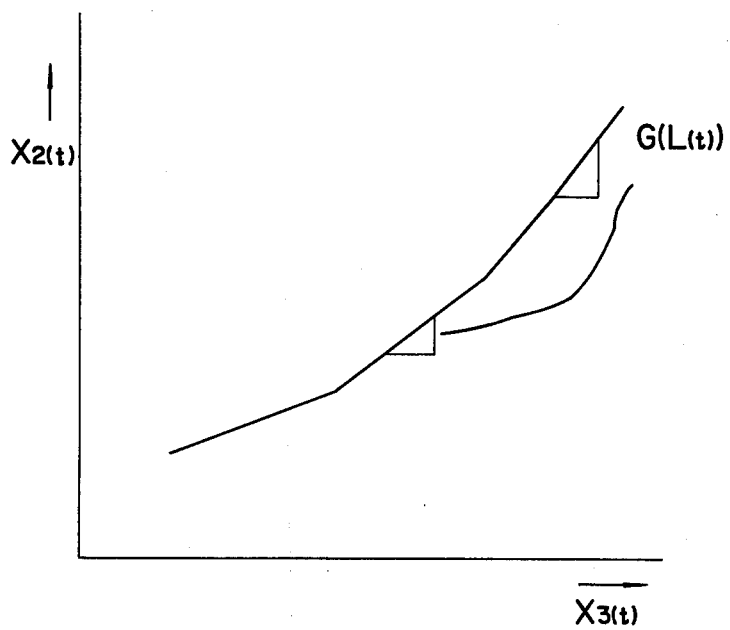
FIG. 8 is a graphical representation showing a characteristic of function generator means when the gain $G(L(t))$ in step 8' of FIG. 7 is variable.

This model operation is effected by steps S8' and S9' in FIG. 7b, particularly, the step S8' putting $G(L(t))=G(X_3(t))$ for varying gain G(L(t)) with $X_3(t)$. This gain may be predetermined as a function of FIG. 8, for example. Step S9' executes equation (25).

In addition to the above difference, the diagnosis for a plant has steps S5', S6', S7' and S13' which are different from the corresponding steps of FIGS. 4a and 4b, and, for distinction, are assigned a symbol of dash (').

For steps S5', S6', S7', S13', S10' and S11', since the plant diagnosis monitors the feedback signal $X_2(t)$ in contrast to the controls output $X_3(t)$ in FIGS. 4a and 4b, corresponding equations are changed as follows:

$E_3(t) = X_2(t) - X_2^*(t)$ (for S5'), $DE_3(t) = E_3(t) - E_3(t - \Delta t)$ (for S6'), $|DE_3(t)| < L_4$ (for S7'), $X_2^*(t) = X_2(t)$ (for S13'), $E_3(t) = |X_3^*(t) - X_3(t)|$ (for S10'), $E_3(t) \geq L_5$ (for S11').

As compared with FIGS. 4a and 4b, FIGS. 7a and 7b handle the different characteristic. Further, FIGS. 7a and 7b compare the plant output $X_2(t)$ with the model output $X_2(t)$ to differ from FIGS. 4a and 4b comparing the controls output $X_3(t)$ with the model output $X_3^*(t)$. All but these differences, the two of the diagnosis for the controls and the plant are based on the same essential idea, and the operation according to the flow chart of FIGS. 7a and 7b will therefore not be further detailed. Needless to say, steps S2, S3 and S4 in FIG. 7a may be applicable to $X_2$ and $X_3$ as in these steps in FIG. 4a.

Flow charts of FIGS. 4a, 4b and FIGS. 7a, 7b, although having been illustrated independently hereinbefore, may be combined, in which case it is expedient to clearly discriminate whether abnormal states occur in the controls or in the plant.

It should be understood from the foregoing description that since, according to the invention, only the coincidence of initial values is normally effected, the execution can be shortened. This ensures that saved time within the sampling time pays to different purposes such that the computer can be operated at high efficiency. Normally, the model operation of step S9 is not executed to prevent accumulation of operation errors and, hence, the model operation per se can be effected with high accuracy. The occurrence of the spike noise also prevents the model operation, thereby preventing an erroneous alarm from being provided.

We claim:

1. A diagnostic device for use with an object to be diagnosed, said object having an automatic control system forming a closed loop and including an integration element in said object, said diagnostic device sampling the input and output of said object with a fixed periodic time so as to obtain digital signals, and detecting an abnormal state of said object in accordance with said digital signals so as to indicate the occurrence of the abnormal state, said diagnostic device comprising:

mathematical model means simulating an input-output characteristic of said object to be diagnosed;

first means for applying to said model means said sampled input of said object in the present period of time when said object output satisfies a predetermined condition for letting the model means execute a calculation to obtain an output of said model means corresponding to the output of said object, and for letting the model means output coincide with the object output in the present period of time without executing the model means calculation when said object output does not satisfy said predetermined condition, said predetermined condition being that a rate of change of said object output is larger than a predetermined value, so that accumulation of errors in the model means calculation when the predetermined condition is not satisfied is avoided; and second means for comparing the output of said model means controlled by said first means with the output of said object in the present period of time, and then for detecting an abnormal state of said object in accordance with a deviation output obtained by the comparison so as to indicate the occurrence of the abnormal state.

2. A diagnostic device according to claim 1, wherein said first means lets the model means output coincide with the object output in the present sampling period of time without executing the model means calculation when one of the input and output of said object is sharply changed at one instant and sharply changed in the opposite direction at a subsequent instant.

3. A diagnostic device according to claim 1, wherein said second means indicates the occurrence of the abnormal state when said second means detects several consecutive occurrences of the abnormal states.

* * * * *